United States Patent
Walters

Patent Number: 5,815,292
Date of Patent: *Sep. 29, 1998

[54] LOW COST DIFFRACTION IMAGES FOR HIGH SECURITY APPLICATION

[75] Inventor: Glenn J. Walters, Duxbury, Mass.

[73] Assignee: Advanced Deposition Technologies, Inc., Taunton, Mass.

[*] Notice: This patent issued on a continued prosecution application filed under 37 CFR 1.53(d), and is subject to the twenty year patent term provisions of 35 U.S.C. 154(a)(2).

[21] Appl. No.: 627,341

[22] Filed: May 6, 1996

Related U.S. Application Data

[63] Continuation-in-part of Ser. No. 604,329, Feb. 21, 1996, abandoned.

[51] Int. Cl.⁶ ............... G02B 5/18; G03H 1/04; B42D 15/10
[52] U.S. Cl. ............... 359/2; 359/567; 359/572; 359/576; 283/86; 283/91; 283/94
[58] Field of Search ............... 359/20, 3, 567, 359/572, 576; 283/86, 87, 91, 94; 428/916

[56] References Cited

U.S. PATENT DOCUMENTS

| | | | |
|---|---|---|---|
| 1,285,753 | 11/1918 | Lowenstein | 283/91 |
| 3,282,720 | 11/1966 | Oleksiw | 117/1 |
| 3,506,327 | 4/1970 | Leith et al. | 350/3.5 |
| 3,881,800 | 5/1975 | Friesem | 350/3.5 |
| 4,014,602 | 3/1977 | Ruell | 350/3.5 |
| 4,034,211 | 7/1977 | Horst et al. | 235/61.12 N |
| 4,119,361 | 10/1978 | Greenaway | 350/1.1 |
| 4,129,382 | 12/1978 | Greenaway | 356/71 |
| 4,168,088 | 9/1979 | Somlyody | 283/8 R |
| 4,210,346 | 7/1980 | Mowry, Jr. et al. | 283/8 B |
| 4,304,809 | 12/1981 | Moraw et al. | 428/195 |
| 4,341,404 | 7/1982 | Mowry, Jr. | 283/8 B |
| 4,398,994 | 8/1983 | Beckett | 156/659.1 |
| 4,417,784 | 11/1983 | Knop et al. | 350/162.19 |
| 4,421,380 | 12/1983 | McGrew | 350/3.78 |
| 4,484,797 | 11/1984 | Knop et al. | 350/162.19 |
| 4,552,614 | 11/1985 | Beckett | 156/640 |
| 4,576,439 | 3/1986 | Gale et al. | 350/162.23 |
| 4,589,686 | 5/1986 | McGrew | 283/85 |
| 4,591,707 | 5/1986 | Stenzel et al. | 235/493 |
| 4,662,653 | 5/1987 | Greenaway | 283/91 |
| 4,673,609 | 6/1987 | Hill | 428/187 |
| 4,677,285 | 6/1987 | Taniguchi | 235/488 |
| 4,685,138 | 8/1987 | Antes et al. | 382/12 |
| 4,717,221 | 1/1988 | McGrew | 350/3.7 |
| 4,728,377 | 3/1988 | Gallagher | 156/58 |
| 4,765,656 | 8/1988 | Becker et al. | 283/70 |
| 4,856,857 | 8/1989 | Takeuchi et al. | 350/3.6 |
| 4,913,858 | 4/1990 | Miekka et al. | 264/1.3 |
| 5,331,443 | 7/1994 | Stanisci | 359/2 |
| 5,513,019 | 4/1996 | Cueli | 359/2 |

FOREIGN PATENT DOCUMENTS

| | | |
|---|---|---|
| 0075674A2 | 4/1983 | European Pat. Off. |
| 0253089A1 | 1/1988 | European Pat. Off. |
| 2027441 | 2/1980 | United Kingdom. |
| 2136352 | 9/1984 | United Kingdom. |

*Primary Examiner*—Jon W. Henry
*Attorney, Agent, or Firm*—Wolf, Greenfield & Sacks, P.C.

[57] ABSTRACT

A security device includes two plastic layers and a metal layer. The plastic layers may be embossed or surface cast with contrasting surface relief diffraction patterns. A second metal layer may be provided including a pattern of voids through which the first metal layer may be seen by a human observer.

21 Claims, 1 Drawing Sheet

LOW COST DIFFRACTION IMAGES FOR HIGH SECURITY APPLICATION

This is a continuation-in-part of application Ser. No. 08/604,329, filed Feb. 21, 1996, now abandoned.

FIELD OF THE INVENTION

The present invention generally relates to authenticating devices, and more particularly relates to diffraction images used as security and anti-counterfeiting components of personal identification cards, credit cards, product labels, documents, currency and the like.

BACKGROUND OF THE INVENTION

Holograms are commonly used as authenticating devices since the hologram, providing a three-dimensional image, is difficult to copy or reproduce. Holograms are records of an interference pattern formed by light at a recording location. Typically a photographic plate, placed at the recording location, is used to make and preserve an original holographic record. Commonly, the recorded interference pattern is that of a three dimensional image of a subject.

Holograms have attained widespread use as authenticating devices because they have historically been difficult to copy. However, along with the desirable characteristic of thwarting counterfeiting by being difficult to copy has come high cost. As equipment suitable for manufacturing security holograms has proliferated, so has the ability to counterfeit the devices. Ironically, despite the wider availability of counterfeit devices, costs have not fallen. Instead, more advanced devices have been developed to thwart the counterfeiter, driving the cost up. Such devices are therefore most useful in very high security applications which may be less cost-sensitive. Two such advanced devices have been disclosed by the present inventor in his U.S. patent applications Ser. Nos. 08/438,776, filed May 11,1995 and 08/561, 191, filed Nov. 21,1995, now U.S. Pat. No. 5,757,521, both incorporated herein by reference.

Commercial holograms, including those discloses in the applicant's prior applications, are most commonly produced by embossing or casting a relief pattern on a thin film. The relief pattern is often a diffraction grating representative of the interference fringes of an original hologram, which may have been photographically recorded. The relief pattern is simply a pattern of ridges on a surface of the thin film. The spacing between the ridges and the width of the ridges corresponds to the spacing and width of the interference fringe pattern in the original hologram. However, the relief pattern itself is not readily seen because the reflectivity, scattering, or transmissivity is insufficient to produce a visible reconstructed light pattern. Most commercial holograms use a thin metallic layer to amplify the holographic relief pattern by reflection. Typically, the metal used for holograms in security devices is aluminum applied using a vacuum evaporative process.

Although not considered true holograms, various patterned diffraction gratings may also be produced by similar methods. While a hologram may be considered to be a special type of diffraction grating, non-hologram diffraction gratings are often sufficiently difficult to reproduce to be appropriate for use in some medium-security applications.

Various credit and identification cards, as well as some product labels, employ commercial holograms or diffraction gratings to deter counterfeiting by providing a visual indication of authenticity. Holograms are used in these and other applications, because the visual indication of authenticity is both difficult to reproduce by conventional means and easily verified by direct observation. For further security, the hologram or diffraction grating based security device may be secured to the document such that the security device will be destroyed or otherwise exhibit evidence of tampering upon any attempt to remove the security device.

Security holograms are normally attached to a document by one of two methods which are selected to provide tamper evidence if one attempts to alter the protected document.

One attachment method is simply to use a pressure sensitive adhesive having a high sheer strength. The hologram is tightly pressed together with a document at room temperature to form a bond. If the sheer strength of the adhesive is sufficiently high, then the metal of the hologram is stripped away from the hologram if one attempts to remove the hologram from the document.

A more popular method of attachment, particularly in high volume operations such as found in applying holograms to credit cards, is a hot stamping technique. In hot stamping, the hologram is carried on a flexible carrier sheet with a wax-like release coating. The release coating is chosen to melt at a much lower temperature than the adhesive. After the hologram is fully pressed against the document at an elevated temperature, the hologram is pulled from the carrier and adheres to the document. In the hot stamping operation, a release layer is not used. Hot stamping also relies on a high sheer strength of the adhesive to visually alter the hologram during tampering, for example by removing metal from the hologram.

Security and authenticating device customers seek both low cost and a level of security appropriate to the application. Holograms owe their high cost to the cost of origination of master artwork, the tooling to emboss or cast the relief pattern on a film and the slow speed at which these processes are performed. Notably, the base cost of materials is inconsequential relative to the final selling cost of an authenticating device.

SUMMARY OF THE INVENTION

The present invention addresses the problems of the conventional holographic and diffraction grating authenticating devices mentioned above, as well as addressing other issues which will be apparent to those skilled in this art. The security device of the present invention provides a mid-level of security protection at a very low cost. While difficult for counterfeiters to copy, the security device of the present invention may be manufactured at high speed, without high artwork origination and tooling costs.

In order to achieve the above objectives and such others as will become apparent to those skilled in this art, a security device according to one aspect of the present invention may include a first plastic film having a surface relief diffraction pattern on a surface thereof, a first metallic layer disposed on the first plastic film, and a second plastic film laminated to the combined first plastic film and metal layer.

This aspect of the present invention is subject to variations. For example, the second plastic film may include a color dye. The second plastic film may also include a second surface relief diffraction pattern on a surface thereof. When provided with the second surface relief diffraction pattern, that pattern may be made to be visually contrasting with the surface relief diffraction pattern of the first plastic film. The surface relief diffraction pattern of the second plastic film may be amplified by disposing a second metal layer on the second plastic film. When such a second metal layer is provided, the second metal layer may be patterned so as not to cover all of the surface area of the second plastic layer. For example, the second metal layer may be formed with void areas that form alphabetic characters or other images. One of the films of the structure according to this aspect of the invention may be formed of polyester. One of the films of this aspect of the present invention may be formed of polyethylene terephthalate.

According to another aspect of the present invention, a method of authenticating an article includes the steps of adhering a plastic film having a surface relief diffraction pattern on a surface thereof to the article to be authenticated, disposing a first metal layer on the plastic film adhered to the article, and laminating a second plastic film to the combined first plastic film and metal layer, wherein the authenticating device is adhered to the article with sufficient strength that the authenticating device is destroyed by attempted removal of the device from the article. Variations of this method, similar to those mentioned above with respect to the authenticating device, are also possible.

According to yet another aspect of the invention, the apertures of the second metal layer of at least a subset of security devices form a unique configuration as compared to security devices not of the subset. The second layer may also include apertures common to all of the security devices. The unique configuration of apertures may include alphanumeric codes which may further be machine-readable, for example formed of bar code symbols.

According to yet another aspect of the invention, the second metal layer may have laser etched therein a configuration of apertures. As above, those apertures may form unique codes, which may be machine-readable, for example bar code symbols representing an alpha-numeric code.

BRIEF DESCRIPTION OF THE DRAWINGS

In the Figures, in which like reference numerals designate like elements.

DETAILED DESCRIPTION

The present invention will be better understood in view of the following detailed description of some embodiments thereof, read in connection with the drawings.

As indicated above, embodiments of the invention include a composite of at least two films where at least one film has a diffraction pattern embossed or cast on a surface thereof and where at least one film has a metallized pattern disposed thereon.

In a first embodiment, a base film is diffraction embossed then fully metallized. This base material is then laminated to a second base film which is dyed, diffraction embossed with a contrasting pattern relative to the first and then patterned metallized. The resultant composite film is then either used as a pressure sensitive label or possibly as a hot foil stamped label.

When viewed by a human observer, an image is seen in the contrasting reflections from the different diffraction embossed materials exposed through the pattern metallized area. The image and security level of the device is further enhanced due to the dye added to or on the film.

Figure 1:
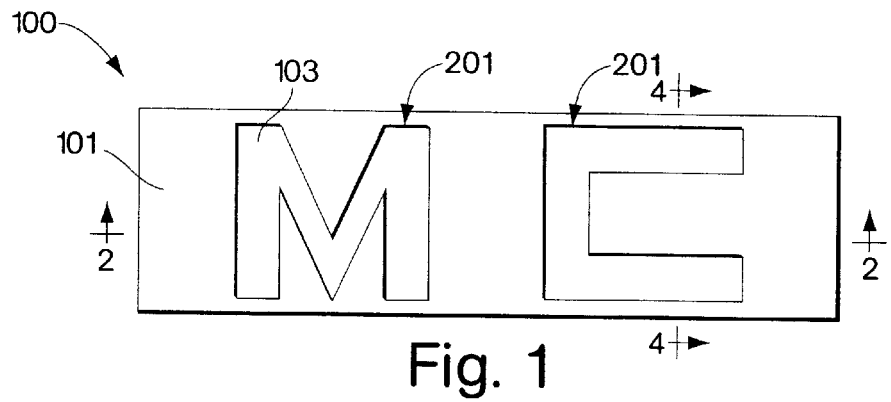
FIG. 1 is a plan view of one embodiment of a security article in accordance with the present invention.
Figure 2:
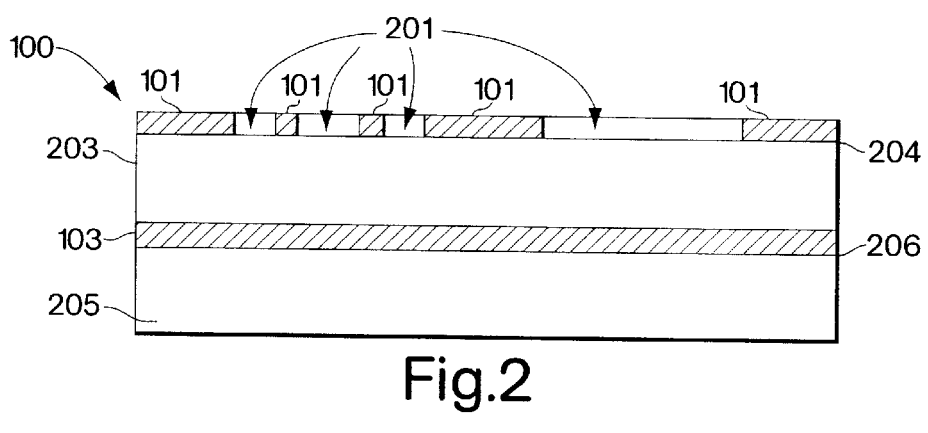
FIG. 2 is a cross section view of the security article of FIG. 1, taken along line 2—2.

Turning now to FIGS. 1 and 2, the structure of the first embodiment of the invention is now described.

As described above, the viewer sees an image formed of contrasting reflections from different materials. A patterned metal layer 101 forms a background for the illustrated image. Apertures 201 formed in the patterned metal layer permit the viewer to see through film 203 a reflection of metal layer 103. Metal layer 103 is disposed on a second plastic film 205. One or both of films 203 and 205 may have embossed or cast into respective surfaces thereof 204 and 206 a surface relief diffraction pattern. By selecting the diffraction patterns to contrast, the image formed may be further enhanced. In addition, the image may yet be further enhanced by introducing a dye onto the surface of film 203 or forming film 203 with the dye included therein. In the preferred version of this embodiment of the invention, film 203 is polyethylene terephthalate, while film 205 is a polyester. The pattern metallized layer 101 and metal layer 103 are formed by the deposition processes disclosed in the applicant's prior applications Ser. Nos. 08/438,776, filed May 11, 1995 pending and 08/561,191, filed Nov. 21, 1995pending. Pattern metallized layer 101 and metal layer 103 may be 10–1000 Å thick. Alternately, metal layers 101 and 103 may be formed by various other deposition and etching processes known in the art.

One useful alternative method for creating a pattern in pattern metalized layer 101 is to laser etch some or all of apertures 201. Some of apertures 201 may be formed as discussed above, during manufacture of the authenticating device, while other apertures 201 may be laser etched independently of and after manufacture of the authenticating device. For example, laser etching may be performed by an end user of the authenticating device, in order to create unique images on a standard stock of authenticating devices. One particularly useful application of this technique is to customize at the point of application of authenticating devices to articles, authenticating devices manufactured using a pattern metalized layer 101 in which a logo or other manufacturer's mark is formed by apertures 201. Laser etching may be used to add to the authenticating device a serial number, date code, plant of origin information or other such similar unique identification. In connection with alphanumeric information, such as serial numbers, date codes and plant of origin information, laser etching can be used to create apertures 201 which form bar code symbols, for example, which is then machine readable. Lasers suitable for performing such etching include but are not limited to YAG lasers and excimer lasers.

Figure 3:
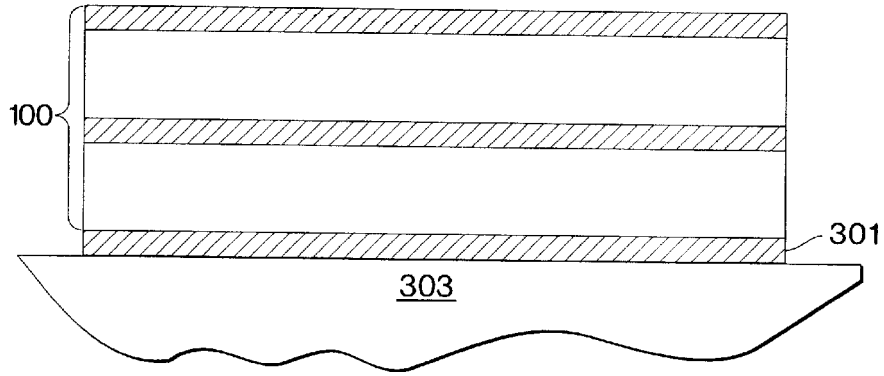
FIG. 3 is a side elevation illustrating the attachment of the security article of FIGS. 1 and 2 to an article to be authenticated.

The authenticating device described above may be attached to an article as illustrated in FIG. 3. An adhesive 301 is disposed between the device 100 and the article 303. The adhesive 301 is selected so that when a fraud is attempted by removing or altering the device 100, the device is caused to delaminate before adhesive 301 releases the device 100 from the article 303. Therefore, the authenticating device cannot be readily transferred from an authentic article such as discarded packaging to a newly manufactured counterfeit article.

Figure 4:
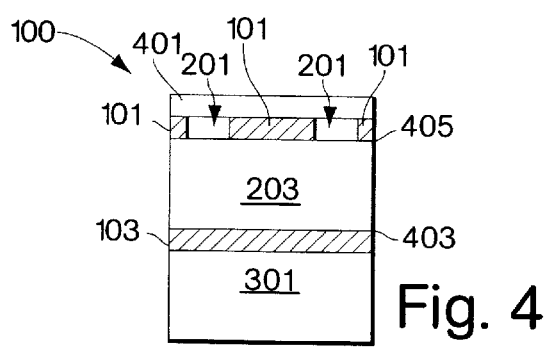
FIG. 4 is a cross section view of an alternate structure of the security article of FIG. 1, taken along line 4—4.

The structure of a second embodiment of the present invention is now described in connection with FIGS. 1 and 4.

This second embodiment of the invention is formed on a base film 203 of plastic. The preferred plastic for film 203 is polyethylene terephthalate. A patterned metal layer 101 again forms a background for the illustrated image. Aperatures 201 formed in the patterned metal layer permit a reflection of metal layer 103 to pass through film 203. In this embodiment, patterned metal layer 101 is protected by a second plastic film 401. A preferred material for film 401 is acrylic. Metal layer 103 may be further coated with an adhesive 301 for attaching the device 100 to an article to be authenticated.

Surface relief diffraction patterns may be provided on one or both surfaces 403 and 405 of film 203. For example, if a surface relief diffraction pattern is formed on surface 403 only, then the image appears as regions 201 of a diffraction pattern surrounded by a shiny metal reflection of patterned metal layer 101. If a surface relief diffraction pattern is further provided on surface 405, then the image appears as a diffraction pattern seen through aperatures 201 surrounded by a contrasting diffraction pattern reflected off of patterned metal layer 101.

This structure, like the structure described in connection with FIGS. 1 and 2 may be adhered to an article to be authenticated by adhesive 301. Adhesive 301 is selected to be stronger than any bond formed between metal layer 103 and plastic film 203. Thus, any attempt to remove or transfer the device 100 from an authenticate article to any other location will result in destruction of the authenticating device. Also, this structure may be laser etched during or after manufacture, as described above with respect to the device illustrated in FIGS. 1 and 2.

All of the components of this new structure may be produced at high speeds in excess of 200 linear feet per minute. The resultant cost of this security device is substantially lower than the cost of a similar size security hologram since there is no laser origination of a master, no special tooling for the image embossing, and no slow speeds of embossing.

It is well known in the art that simple diffraction embossing or casting can be done with low cost tooling and relatively high speeds, when compared to similar operations to produce holograms. The pattern metallization can also be done at relatively high speeds and low costs. The lamination and subsequent steps for die cutting and pressure adhesive application are well known processes which are routinely used in industry. However, combining these processes as discussed above yields a very complicated and highly secure structure which is not easily duplicated.

Furthermore, devices made in accordance with the present invention appear similar to expensive conventional holograms but are produced at a fraction of the cost. They are nearly as difficult to counterfeit as a traditional security hologram.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto and equivalents thereto.

What is claimed is:

1. A security device, comprising:
   a first plastic film having a surface relief diffraction pattern on a first surface thereof;
   a first metal layer disposed on the first plastic film;
   a second plastic film laminated to a structure including the first plastic film and the first metal layer; and
   a second metal layer which is reflective everywhere except where an aperture therethrough has an edge which defines an outline of an image seen as a reflection of the first metal layer, the second metal layer disposed on the second plastic film.

2. The security device of claim 1, wherein the second plastic film has a surface relief diffraction pattern on a surface thereof.

3. The security device of claim 2, wherein the surface relief diffraction pattern of the second plastic film contrasts with the surface relief diffraction pattern of the first plastic film.

4. The security device of claim 1, wherein the second plastic film contains a color dye.

5. The security device of claim 2, wherein at least one of the first plastic film and the second plastic film is formed of polyester.

6. The security device of claim 2, wherein at least one of the first plastic film and the second plastic film is formed of polyethylene terephthalate.

7. The security device of claim 1, wherein the first plastic film has a surface relief diffraction pattern on a second surface thereof.

8. In a plurality of security devices as recited in claim 1, the second metal layer of a subset of the plurality including a configuration of apertures unique to the subset.

9. In the security devices of claim 8, the second metal layer pattern of each security device including a configuration of apertures common to all of the plurality of security devices.

10. In the security devices of claim 8, the configuration of apertures unique to the subset forming an alpha-numeric code.

11. In the security devices of claim 10, the alpha-numeric code being machine-readable.

12. In the security device of claim 11, the alpha-numeric code formed by bar code symbols.

13. The security device of claim 1, the second metal layer of the device including a configuration of apertures formed by laser etching the second metal layer.

14. The security device of claim 13, wherein the configuration of apertures form an alpha-numeric code.

15. The security device of claim 14, wherein the alpha-numeric code is machine-readable.

16. The security device of claim 15, wherein the alpha-numeric code is formed by bar code symbols.

17. A security device, comprising:
   a first plastic film having a surface relief diffraction pattern on a first surface thereof;
   a first metal layer disposed on the first plastic film;
   a second metal layer which is reflective everywhere except where an aperture therethrough has an edge which defines an outline of an image seen as a reflection of the first metal layer, the second metal layer disposed on the first plastic film, the first and second metal layers disposed on the first and second surfaces of the first plastic film, respectively, and a second plastic film laminated to a structure including the first plastic film and the metal layers.

18. The security device of claim 17, wherein the second plastic film is a protective layer laminated to the first metal film and wherein the first metal film is patterned, whereby the first surface does not have metal over all of the surface area thereof.

19. The security device of claim 17, wherein the first plastic film is formed of polyethylene terephthalate.

20. The security device of claim 17, wherein the second plastic film is formed of acrylic.

21. The security device of claim 17, wherein the first plastic film contains a color dye.

* * * * *